(12) United States Patent
Koveal et al.

(10) Patent No.: US 6,326,442 B1
(45) Date of Patent: Dec. 4, 2001

(54) MULTISTAGE METHOD FOR MANUFACTURING POLYOLEFINS

(75) Inventors: Russell John Koveal, Baton Rouge, LA (US); James John McAlpin, Houston; Jeffrey Lawrence Brinen, League City, both of TX (US)

(73) Assignee: Exxon Mobil Chemical, Inc., Houston, TX (US)

( * ) Notice: Subject to any disclaimer, the term of this patent is extended or adjusted under 35 U.S.C. 154(b) by 0 days.

(21) Appl. No.: 09/570,946

(22) Filed: May 15, 2000

Related U.S. Application Data

(63) Continuation of application No. 08/959,759, filed on Oct. 29, 1997, now Pat. No. 6,066,701.
(60) Provisional application No. 60/033,951, filed on Dec. 31, 1996.

(51) Int. Cl.[7] ................. C08F 2/01; C08F 2/06; C08G 85/00
(52) U.S. Cl. ................. 526/64; 526/66; 526/68; 526/69; 526/70; 526/79; 526/351; 526/160; 422/132; 422/134
(58) Field of Search ................. 526/64, 66, 68, 526/69, 70, 79, 351, 160, 943; 442/132, 134

(56) References Cited

U.S. PATENT DOCUMENTS

| | | |
|---|---|---|
| 2,936,303 | 5/1960 | Goins . |
| 3,957,448 | 5/1976 | Shepard et al. . |
| 3,965,083 | 6/1976 | Jezl et al. . |
| 3,971,768 | 7/1976 | Peters et al. . |
| 4,101,289 | 7/1978 | Jezl et al. . |
| 4,187,278 * | 2/1980 | Clifford ................. 422/132 |
| 4,710,482 | 12/1987 | Job . |
| 5,240,894 | 8/1993 | Burkhardt et al. . |
| 5,504,166 | 4/1996 | Buchelli et al. . |

FOREIGN PATENT DOCUMENTS

| | | |
|---|---|---|
| 0 574 821 | 6/1992 | (EP) . |
| 0 533 452 | 9/1992 | (EP) . |
| 0 560 312 | 9/1993 | (EP) . |
| WO 93/24533 | 12/1903 | (WO) . |

* cited by examiner

Primary Examiner—David W. Wu
Assistant Examiner—R. Harlan

(57) ABSTRACT

The present invention provides a method for substantially continuously polymerizing olefins comprising: introducing into a first reaction zone a fresh olefin polymerization catalyst; contacting said fresh olefin polymerization catalyst in said first reaction zone with a first vent mixture at a first feed rate and under conditions sufficient to form and avoid melting a polyolefin, wherein first vent mixture comprises unreacted olefins and a diluent vented from a second reaction zone; withdrawing a vent product of unreacted olefins and diluent from said first reaction zone; withdrawing from said first reaction zone a first product mixture comprising said catalyst and said polyolefin; passing said first product mixture to said second reaction zone; contacting said first product mixture in said second reaction zone with a second vent mixture at a second feed rate and under conditions sufficient to form and avoid melting said polyolefin, wherein said second vent mixture comprises a material selected from the group consisting of a fresh feed and a mixture comprising unreacted olefins and diluent from a third reaction zone; and, withdrawing from said second reaction zone a second product mixture comprising said catalyst and said polyolefin.

22 Claims, 1 Drawing Sheet

US 6,326,442 B1

MULTISTAGE METHOD FOR MANUFACTURING POLYOLEFINS

Continuation of prior application Ser. No: 08/959,759 filed Oct. 29, 1997, U.S. Pat. No. 6,066,701.

This application claims priority to U.S. Provisional Patent Application No. 60/033,951, filed Dec. 31, 1996.

FIELD OF THE INVENTION

The present invention relates to a process for polymerizing olefins to polyolefins. More particularly, the invention relates to a process for polymerizing dilute olefin feeds using a multistage reactor system in which the freshest catalyst is used to process the most dilute feeds.

BACKGROUND OF THE INVENTION

Most of the current processes for producing polyolefins are co-current in nature and require a highly concentrated and purified olefin feedstock, which results in increased complexity and cost for polyolefin production. As the catalyst and olefin streams proceed through a series of reactors, increasingly dilute olefin is contacted with increasingly less active catalyst. As a consequence, incomplete conversion of the olefin is achievable in a single pass through the reactor. The unconverted olefin must be recycled to the beginning of the process. Unless a portion of this recycled stream is purged, the concentration of diluents in the polymerization reactors builds to unacceptable levels. In many current polymerization processes, the amount of purge ultimately is determined by the content of diluents in the fresh feed. High diluent concentrations in the feed demand high purge rates and concomitant olefin loss. In order to avoid such loss, extensive and complex separation schemes are required, which greatly increase the complexity, investment, and operational cost while reducing the reliability of the polymerization process.

An effective, efficient process is needed for handling dilute olefin feeds.

SUMMARY OF THE INVENTION

The present invention provides a method for substantially continuously polymerizing olefins comprising: introducing into a first reaction zone a fresh olefin polymerization catalyst; contacting said fresh olefin polymerization catalyst in said first reaction zone with a first vent mixture at a first feed rate and under conditions sufficient to form and avoid melting a polyolefin, wherein first vent mixture comprises unreacted olefins and a diluent vented from a second reaction zone; withdrawing a vent product of unreacted olefins and diluent from said first reaction zone; withdrawing from said first reaction zone a first product mixture comprising said catalyst and said polyolefin; passing said first product mixture to said second reaction zone; contacting said first product mixture in said second reaction zone with a second vent mixture at a second feed rate and under conditions sufficient to form and avoid melting said polyolefin, wherein said second vent mixture comprises a material selected from the group consisting of a fresh feed and a mixture comprising unreacted olefins and diluent from a third reaction zone; and, withdrawing from said second reaction zone a second product mixture comprising said catalyst and said polyolefin.

DETAILED DESCRIPTION OF THE INVENTION

Figure 1:
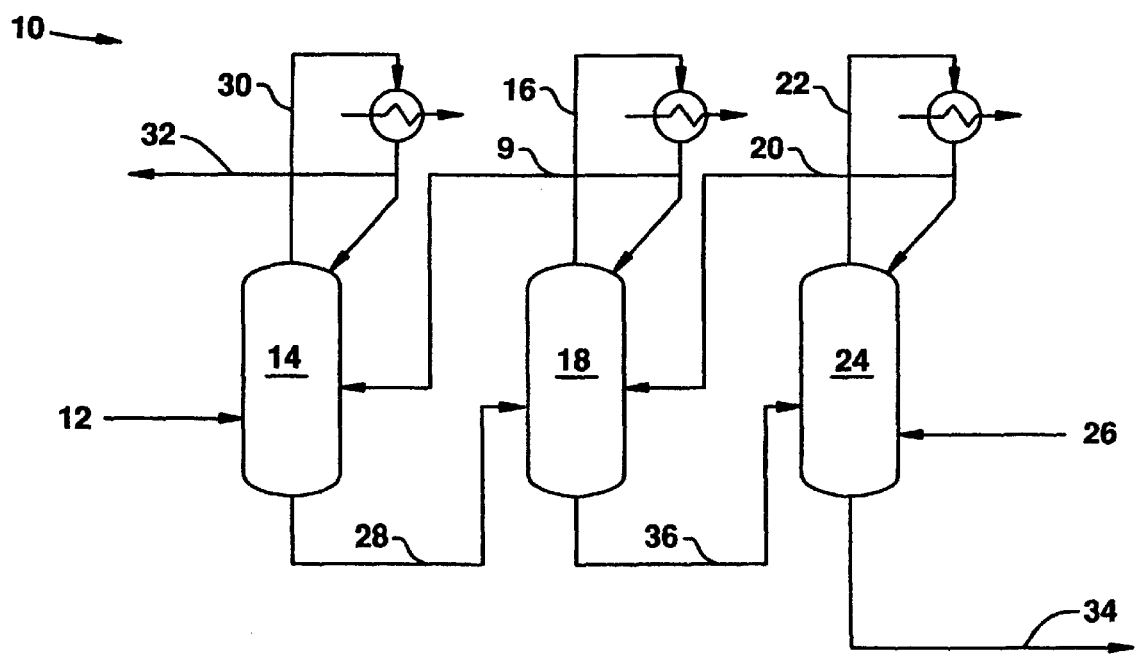
FIG. 1 is a schematic diagram of a three stage reactor system according to the present invention.

The present invention provides a system which effectively and efficiently polymerizes olefin feeds, particularly dilute olefin feeds. The system preferably is a solid/liquid slurry system with multiple stages; however, a multistage gas phase fluid bed system also could be used. A person of ordinary skill in the art will recognize that the concepts of the invention are applicable to any number of reactors greater than or equal to two. Also contemplated is a plug flow reactor (not shown), in which provision can be made for countercurrent plug flow of an olefin mixture and a catalyst polymer.

The invention will be best understood with reference to FIG. 1, in which a reactor system incorporating the features of the present invention is designated generally as 10. In the system 10, fresh polymerization catalyst is added to a first reactor 14 at 12. Any form of catalyst that is active and selective for olefin polymerization may be used in the present invention. Preferred catalysts are Zeigler-Natta type catalysts and metallocene catalysts. Suitable Zeigler-Natta catalysts include, but are not necessarily limited to those described in U.S. Pat. No. 4,710,482, incorporated herein by reference, which are commercially available from Catalyst Resources, Inc., Pasadena, Tex. Suitable metallocene catalysts include, but are not necessarily limited to cyclopentadienyl derivatives of transition metals or metal halides, preferably as illustrated in U.S. Pat. No. 5,240,894, incorporated herein by reference. The catalyst may be added in solution or slurry form with a suitable carrier, such as a hydrocarbon. In a preferred embodiment, a metallocene catalyst is mixed with a mineral oil to produce a slurry comprising about 20 wt. % catalyst.

The first reaction zone 14 is the inside of the first reactor 14. In the first reaction zone 14, the catalyst 12 is contacted with olefin feed 9. The olefins in the feed 9 may be substantially any olefins, with preferred olefins being ethylene, propylene, butene-1, hexene-1, and their derivatives. The olefin feed 9 to the first reaction zone 14 preferably is dilute, comprising about 50 wt. %, most preferably comprising about 30 wt. % or less olefins. The remainder of the olefin feed 9 preferably should be an inert diluent gas, such as propane, in the case where propylene is the major component of the olefin mixture.

Where propylene is the major olefin component and propane the main diluent, the initial reaction resulting from contact of fresh catalyst with olefin is highly exothermic. The heat of the reaction preferably is removed by condensing vapor 30 from the first reactor 14 and returning a portion of the condensed vapor 30 to the reactor. A portion of the condensed vapor also is removed as purge 32. Although it is preferred to cool the vapor by condensation, other means of cooling may be used, such as internal cooling coils or reactor cooling jackets. In a preferred embodiment, the vapor removed from each reactor is returned to cool the same reactor.

The temperature in the reactor should be maintained below a temperature at which the polymer being produced will melt. For polyethylene, the temperature should be maintained below about 110° C., for polypropylene, below about 90° C. In the slurry case, the pressure in the reactor will be determined by the vapor pressure of the mixture in the reactor. The rate at which the feed moves through the reactor preferably should be maintained to adjust the solids content of the product slurry in that reactor to between about 10–30 volume %. Once the olefin feed has passed through the first reactor, the first reaction mixture, which comprises catalyst/polymer slurry, is removed from the first reactor 14 at 28 and fed to the second reactor 18. The same series of events occurs in each of reactors 14, 18, and 24.

The olefin feed 9 for the first reactor 14 is a vent mixture 16 comprising unreacted olefins and diluent from a second reactor 18. The olefin feed 20 for the second reactor 18 comprises a vent mixture 22 comprising unreacted olefins and diluent from a third reactor 24. The olefin feed 26 for this third reactor may originate from a number of sources, a preferred source being the purge stream from a traditional polymerization system that is designed to process highly concentrated and purified olefin feeds (not shown). The third reactor 24 encounters the most concentrated olefin feed 26, which typically should be greater than about 50 wt. % olefins, and the first reactor 14 encounters the most dilute olefin feed 9, which should be about 50 wt. % olefins or less, preferably about 30 wt. % olefins or less.

According to the present invention, fresh catalyst 12 is in its most active state when it contacts the most dilute olefin feed 9. The catalyst is in its least active state when it contacts the most concentrated olefin feed 26. The use of fresh catalyst 12 to process the most dilute feed 9: (a) aids in the conversion of the dilute olefin feed to polyolefin; (b) reduces olefin loss to the purge stream 32; and (c) avoids overheating of the catalyst from the highly exothermic reaction that occurs when fresh catalyst contacts concentrated olefins. Such a system also provides for controlled activation of the polymerization catalyst, a step which often is achieved by treating the catalyst with monomer in a process called prepolymerization. The present invention eliminates the need for a costly prepolymerization step.

Reactors 14, 18, 24 preferably are any type of counter-current reactor that can be used to process a solid/liquid slurry. Suitable reactors include those described in the following U.S. Patents, which are hereby incorporated by reference: U.S. Pat. Nos. 3,957,448; 3,965,083; 3,971,768; 4,101,289; and 5,504,166. Reactors 18 and 24 preferably should have the same or similar construction to reactor 14.

The final product mixture preferably is the product mixture from the third reactor 24 comprising catalyst/polymer slurry which is withdrawn at 34. The final product mixture may be handled in a number of ways. In a preferred embodiment, the system of the present invention is integrated into a separate system designed to polymerize concentrated olefin feeds, and the final product mixture is returned for further processing to the main polymerization reactor. Such integration avoids the need for complex physical separation systems to supply concentrated olefin feeds to the main reactor.

Greater or fewer reaction stages may be used depending upon the particular application. Persons of ordinary skill in the art also will be able to adjust reactor volumes, pressures, and temperatures to optimize olefin recovery and catalyst activity in a particular application.

The invention will be more clearly understood with reference to the following Examples:

EXAMPLE 1

A metallocene catalyst is prepared in the manner described in the U.S. Pat. No. 5,240,894, which has been incorporated herein by reference. The solid catalyst is slurried in mineral oil which has been thoroughly air freed. The final slurry catalyst contains about 20 wt. % solids. The catalyst has a final particle size of about 50 microns.

EXAMPLE 2

A reaction system as illustrated in FIG. 1 has three stirred autoclave type reactors of 28.3 cubic meters (1000 cubic feet) volume each rated for pressures to 3.4 MPag (500 psig) at temperatures up to 200° F. The reactors have instrumentation allowing control of temperature, pressure, and the level of a contained liquid or slurry. Provision for the removal of heat from the reaction is through boiling of the suspending liquid and its condensation in an overhead cooler. The resulting condensate typically is returned to the reaction mixture of the same reactor, but may be routed elsewhere if required.

2.27 Kg (5 pounds) per hour of the metallocene catalyst slurry prepared in Example 1 (12 in FIG. 1) is fed to the first reactor (14 in FIG. 1) using a diaphragm pump. A vent stream (9 in FIG. 1) comprising a mixture of about 50 wt. % propylene and 50 wt. % propane is fed to the first reactor from the condenser of the second reactor (18 in FIG. 1 ) at a rate of about 9,070 kg/hr (20,000 lb/hr). The temperature in the first reactor is controlled at about 65° C. (150° F.) and the pressure, set by the mixture's vapor pressure, is about 30.6 MPag (450 psig). The slurry level also is controlled.

A vent stream (32 in FIG. 1) is taken from the condenser of the first reactor at a rate of about 6,800 kg/hr (15,000 lb/hr). The composition of this vent stream is about 33 wt. % propylene, 67 wt. % propane. Product slurry is withdrawn from the first reactor, and comprises approximately: about 0.45 kg/hr (1 lb/hr) of catalyst; about 2,270 kg/hr (5,000) lb/hr of product polypropylene; and, diluent propane. The polymer and catalyst are separated from this stream (at 28 in FIG. 1) and passed into a second reactor (18 in FIG. 1). The diluent and unreacted monomer separated from the product slurry from the first reactor are returned to the first reactor (14 in FIG. 1).

To the second reactor is fed a vent stream (20 in FIG. 1) comprising about 11,340 kg/hr (25,000 lb/hr) of a mixture of 60 wt. % propylene and 40 wt. % propane taken from the condenser of the third reactor (24 in FIG. 1). The second reactor is controlled at a temperature of about 63 ° C. (145 ° F.) and a pressure of about 29.6 MPag (435 psig). The slurry level also is controlled. A vent stream (50 wt. % propylene, 50 wt. % propane) is taken from the condenser of the second reactor and fed to the first reactor at a rate of about 9,070 kg/hr (20,000 lb/hr), as already described. Product slurry is withdrawn from the second reactor (36 in FIG. 1), and comprises approximately: about 0.45 kg/hr (1 lb/hr) of catalyst; about 4,530 kg/hr (10,000 lb/hr) of product polypropylene; and, about 5,440 kg/hr (12,000 lb/hr) of unreacted propylene and diluent propane. The polymer and catalyst are separated from this stream and passed into a third reactor (24 in FIG. 1). The diluent and unreacted monomer separated from the product slurry in the second reactor is returned to the second reactor (at 16 in FIG. 1).

To the third reactor is fed about 13,608 kg/hr (30,000 lb/hp) of a mixture of 67 wt. % propylene and 33 wt. % propane (26 in FIG. 1). The third reactor is controlled at a temperature of 60° C. (140 ° F.) and a pressure of about 28.9 MPag (425 psig). The slurry level also is controlled. A vent stream (60 wt. % propylene, 40 wt. % propane) is taken from the condenser of the third reactor and fed to the second reactor (20 in FIG. 1) at a rate of 11,340 kg/hr (25,000 lb/hr). Product slurry is withdrawn from the third reactor (34 in FIG. 1) and comprises approximately: about 0.45 kg/hr (1 lb/hr) of catalyst; about 6,800 kg/hr (15,000 lb/hr) of product polypropylene; and, about 7,710 kg/hr (17,000 lb/hr) of unreacted propylene and diluent propane. The polymer and catalyst are separated from this stream and recovered as product. The diluent and unreacted monomer separated from the product slurry from the third reactor is returned to the third reactor (22 in FIG. 1).

Persons of ordinary skill in the art will recognize that many modifications may be made to the present invention without departing from the spirit and scope of the present invention. The embodiments described herein are illustrative only and should not be taken as limiting the invention, which is defined in the following claims.

We claim:

1. A method for polymerizing olefins, comprising contacting an olefin polymerization catalyst with olefin in a countercurrent flow reaction system having at least two reactors in series.

2. The method of claim 1, wherein the catalyst is in its most active state when it contacts olefin in its most dilute state.

3. The method of claim 1, wherein vent gas is removed from one reactor in the reaction system and sent to another reactor in the reaction system.

4. The method of claim 3, wherein a portion of the vent gas is recycled back to the reactor from which it was removed.

5. The method of claim 3, wherein the vent gas sent to another reactor in the reaction system comprises 50 wt. % olefin or less.

6. The method of claim 5, wherein the vent gas sent to another reactor in the reaction system comprises 30 wt. % olefin or less.

7. The method of claim 1, wherein the olefin is ethylene.

8. The method of claim 1, wherein the olefin is propylene.

9. The method of claim 1, wherein the olefin polymerization catalyst is a metallocene catalyst.

10. The method of claim 1, wherein the olefin polymerization catalyst is a Zeigler-Natta catalyst.

11. The method of claim 1, wherein the reaction system has two reactors in series.

12. The method of claim 1, wherein the reaction system has three reactors in series.

13. A method for polymerizing olefins, comprising:

inputting olefin polymerization catalyst at one end of a reaction system having at least two reactors in series;

inputting olefin at another end of the reaction system;

removing vent gas from at least one of the reactors;

recycling a portion of the vent gas to the reactor from which it was removed; and inputting a portion of the removed vent gas into a reactor different from which it was removed.

14. The method of claim 13, wherein the portion of the removed vent gas is input into a reactor containing catalyst in a more active state than the one from which the portion of the removed vent gas was removed.

15. The method of claim 13, wherein the vent gas input into the reactor comprises 50 wt. % olefin or less.

16. The method of claim 15, wherein the vent gas input into the reactor comprises 30 wt. % olefin or less.

17. The method of claim 13, wherein the olefin is ethylene.

18. The method of claim 13, wherein the olefin is propylene.

19. The method of claim 13, wherein the olefin polymerization catalyst is a metallocene catalyst.

20. The method of claim 13, wherein the olefin polymerization catalyst is a Zeigler-Natta catalyst.

21. The method of claim 13, wherein the reaction system has two reactors in series.

22. The method of claim 13, wherein the reaction system has three reactors in series.

* * * * *